(12) United States Patent
Okodogbe et al.

(10) Patent No.: US 11,503,906 B1
(45) Date of Patent: Nov. 22, 2022

(54) SEATING ARRANGEMENT FOR INTERACTIVE LEARNING

(71) Applicants: Maryqueen Okodogbe, Amityville, NY (US); Victor Okodogbe, Amityville, NY (US)

(72) Inventors: Maryqueen Okodogbe, Amityville, NY (US); Victor Okodogbe, Amityville, NY (US)

( * ) Notice: Subject to any disclaimer, the term of this patent is extended or adjusted under 35 U.S.C. 154(b) by 312 days.

(21) Appl. No.: 16/780,970

(22) Filed: Feb. 4, 2020

(51) Int. Cl.
| | |
|---|---|
| *A47D 15/00* | (2006.01) |
| *A47B 39/02* | (2006.01) |
| *A47B 39/12* | (2006.01) |
| *A47D 1/00* | (2006.01) |
| *B43L 13/20* | (2006.01) |
| *G09B 5/02* | (2006.01) |
| *G09B 19/00* | (2006.01) |
| *G06F 3/0354* | (2013.01) |
| *A47C 3/40* | (2006.01) |
| *A47C 7/00* | (2006.01) |
| *A47C 7/66* | (2006.01) |

(52) U.S. Cl.
CPC ............. *A47B 39/12* (2013.01); *A47B 39/02* (2013.01); *A47D 1/002* (2013.01); *A47D 1/0085* (2017.05); *B43L 13/205* (2013.01); *G09B 5/02* (2013.01); *G09B 19/00* (2013.01); *A47C 3/40* (2013.01); *A47C 7/006* (2013.01); *A47C 7/666* (2018.08); *A47D 15/006* (2013.01); *G06F 3/03545* (2013.01)

(58) Field of Classification Search
CPC ........ A47D 1/0085; A47B 23/02; G09B 5/02; G09B 19/00; G09B 1/04; B62B 9/26; B62B 9/00; B62B 9/245
See application file for complete search history.

(56) References Cited

U.S. PATENT DOCUMENTS

| | | | | |
|---|---|---|---|---|
| 4,946,180 | A * | 8/1990 | Baer | A47D 1/0081 280/47.38 |
| 5,254,007 | A | 10/1993 | Eagan | |
| 5,458,394 | A * | 10/1995 | Nichols | B62B 9/245 297/173 |
| 9,167,911 | B2 * | 10/2015 | Vlosich | A47D 11/00 |
| 9,918,562 | B1 * | 3/2018 | Smith | A47D 1/02 |
| 2009/0179394 | A1 * | 7/2009 | Huber | B62B 3/144 280/47.38 |
| 2016/0025326 | A1 * | 1/2016 | Gonchar | A47K 11/04 362/127 |
| 2020/0353772 | A1 * | 11/2020 | Pires | A47B 23/002 |

* cited by examiner

*Primary Examiner* — Sarah B McPartlin
(74) *Attorney, Agent, or Firm* — Sanchelima & Associates, P.A.; Christian Sanchelima; Jesus Sanchelima

(57) ABSTRACT

A seating arrangement for interactive learning is disclosed herein. The arrangement comprises a chair for supporting a child thereon; a tray removably supported on the chair; and at least one interactive media configured on the tray for facilitating interactive learning to the child supported on the chair. In an embodiment, the interactive media may include an electronic interactive device such as a tablet. In another embodiment, the interactive learning media may include a writing pad and a stylo for allowing the child to practice the usage of the stylo on the writing pad. In an embodiment, the writing pad may be an electronic writing pad.

9 Claims, 6 Drawing Sheets

SEATING ARRANGEMENT FOR INTERACTIVE LEARNING

BACKGROUND OF THE INVENTION

1. Field of the Invention

The present disclosure relates to the field of seating arrangements. In particular, the present disclosure relates to the field of seating arrangements having means for facilitating interactive learning.

2. Description of the Related Art

Baby highchairs are known in the art. A highchair is a chair, typically used for feeding children. The seat of the highchair is raised a fair distance from the ground to allow a person of adult height spoon-feed the child while standing position. In recent times, due to the advent of technologies like smartphones and tablets, parents have been using these devices to display content such as nursery rhymes and the like to the child while feeding. It is, however, not good for the eyes of the child to view such devices for longer durations.

Several designs for highchairs have been designed in the past. None of them, however, include a highchair system comprising a seat the is support by four telescoping height adjustable legs and has two arm rests, wherein the arm rests support as slidably mounted tray apparatus. A first tray apparatus includes two hingedly attached panels that when in the close position create an eating surface and when in the open position provide two entertainment surfaces on each side of a center surface that is formed to receive a third entertainment tray with electronic devices integrated therein. None of the highchairs are known to have a multiple applicability including allowing the child to eat food thereon, providing maximum comfort to the child, as well as facilitating interactive learning for the child.

Applicant believes that a related reference corresponds to U.S. Pat. No. 5,254,007 filed by Chris S. Eagan. Eagan discloses a baby entertainment and learning apparatus for highchairs including a removable tray having in its top surface a series of pressure sensitive microswitches. A series of interchangeable tray top panels, each presenting a series of depressible picture blocks, may be selectively placed on the highchair tray for overlaying and activating the microswitches of the tray. However, the apparatus disclosed by Eagan fails to disclose a highchair having multiple applicability including allowing the child to eat food thereon, providing maximum comfort to the child, as well as facilitating interactive learning for the child.

Applicant believes that another related reference corresponds to U.S. Pat. No. 4,946,180 filed by Luke Baer. Baer discloses a child support apparatus for use as a safety car seat, stroller, highchair and crib. The apparatus has telescoping legs with retractable wheels and pivotable handles which may be extended to function as a stroller or retracted and pivoted to become a safety car seat. However, the apparatus disclosed by Baer fails to disclose a highchair having multiple applicability including allowing the child to eat food thereon, providing maximum comfort to the child, as well as facilitating interactive learning for the child.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a highchair having multiple applicability.

It is an object of the present invention to provide a highchair that allows a child to eat food thereon, while providing maximum comfort to the child, as well as facilitating interactive learning for the child.

Further objects of the invention will be brought out in the following part of the specification, wherein detailed description is for the purpose of fully disclosing the invention without placing any limitations thereon.

BRIEF DESCRIPTION OF THE DRAWING

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
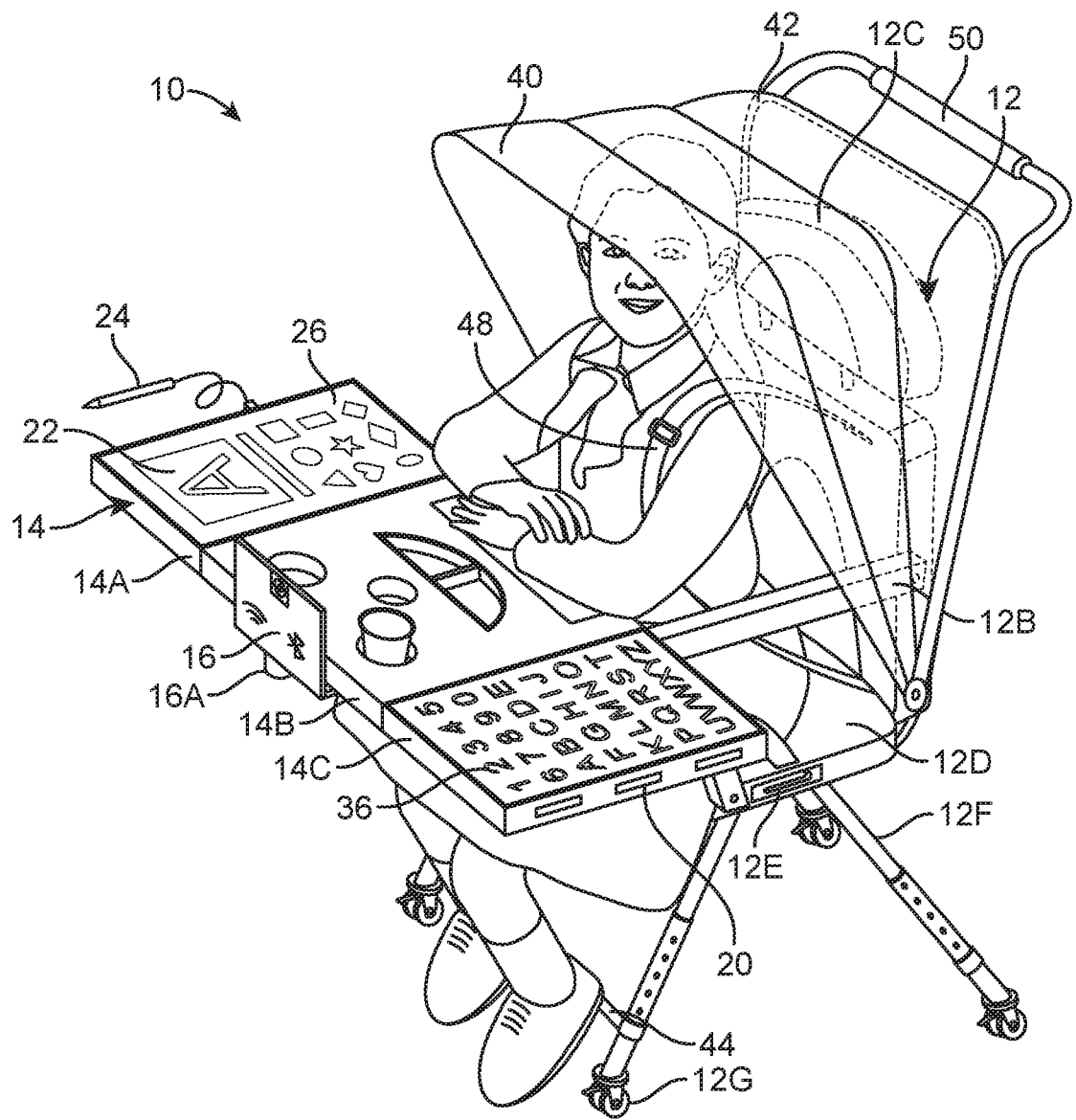
FIG. 1 illustrates an isometric view of a seating arrangement 10 for interactive learning, in accordance with an embodiment of the present invention, wherein arrangement 10 comprises a chair 12 for supporting a child thereon, a tray 14 removably supported on chair 12, and at least one interactive media 16 configured on tray 14 for facilitating interactive learning to the child supported on chair 12.

Referring now to FIGS. 1 thru 6, where the present invention is generally referred to with numeral 10, it can be observed that a seating arrangement for interactive learning 10 (hereinafter referred to as arrangement 10), in accordance with an embodiment of the present invention, comprises a chair 12 for supporting a child thereon, a tray 14 removably supported on chair 12, and at least one interactive media 16 configured on tray 14 for facilitating interactive learning to the child supported on chair 12. At least one interactive media 16 may be water resistant or waterproof. It may also be suitable for at least one interactive media 16 to be removable.

Arrangement 10, in accordance with an embodiment of the present invention, provides the applicability of a conventional highchair by supporting child thereon, while also providing interactive learning to the child. Furthermore, the chair of arrangement 10 is designed to provide maximum comfort to the child supported thereon. Arrangement 10 comprises chair 12. Tray 14 is removably supported on the chair 12. In an embodiment, the removable connection of tray 14 with chair 12 is facilitated via rails 12A provided on armrests 12B of chair 12.

Tray 14 comprises a first section 14A, a second section 14B, and a third section 14C: In accordance with one embodiment of the present invention, sections 14A, 14B, 14C are in modular connection with each other. In an embodiment, the modular connection is facilitated via protrusions 18 and slots 20. More specifically, first section 14A includes slots 20 configured along an edge thereof. Second section 14B includes protrusions 18 configured on the edge that interfaces with first section 14A, and second section 20 includes slots 20 configured on the edge that interfaces the third section 14C. Correspondingly, third section 14C includes protrusions 18 configured on the edge that interfaces with second section 14B. The modular nature of coupling different sections of tray 14 may allow the parent or the child to remove or add any section of tray 14. For example, eating section of tray 14 may be replaced by a learning section after the child has had a meal. In an embodiment, eating section may be the section having means to hold an eating dish and watercups, whereas learning section may be a section of tray 14 having interactive learning media configured thereon. It is to be noted that the number of sections on tray 14 is not limited to three, and tray 14 can have either more than three or less than three sections.

Arrangement 10 further comprises at least one writing pad 22 and at least one stylo 24 provided on first section 14A. In accordance with an embodiment of the present invention, writing pad 22 may be an electronic writing pad that is in electrical connection with stylo 24. Arrangement 10 further comprises a stencil 26 containing a plurality of shapes configured on first section 14A. The child supported on arrangement 10 may use writing pad 22 and stylo 24 for practicing writing the alphabet or numbers or for simply drawing different shapes present on stencil 26.

Figure 2:
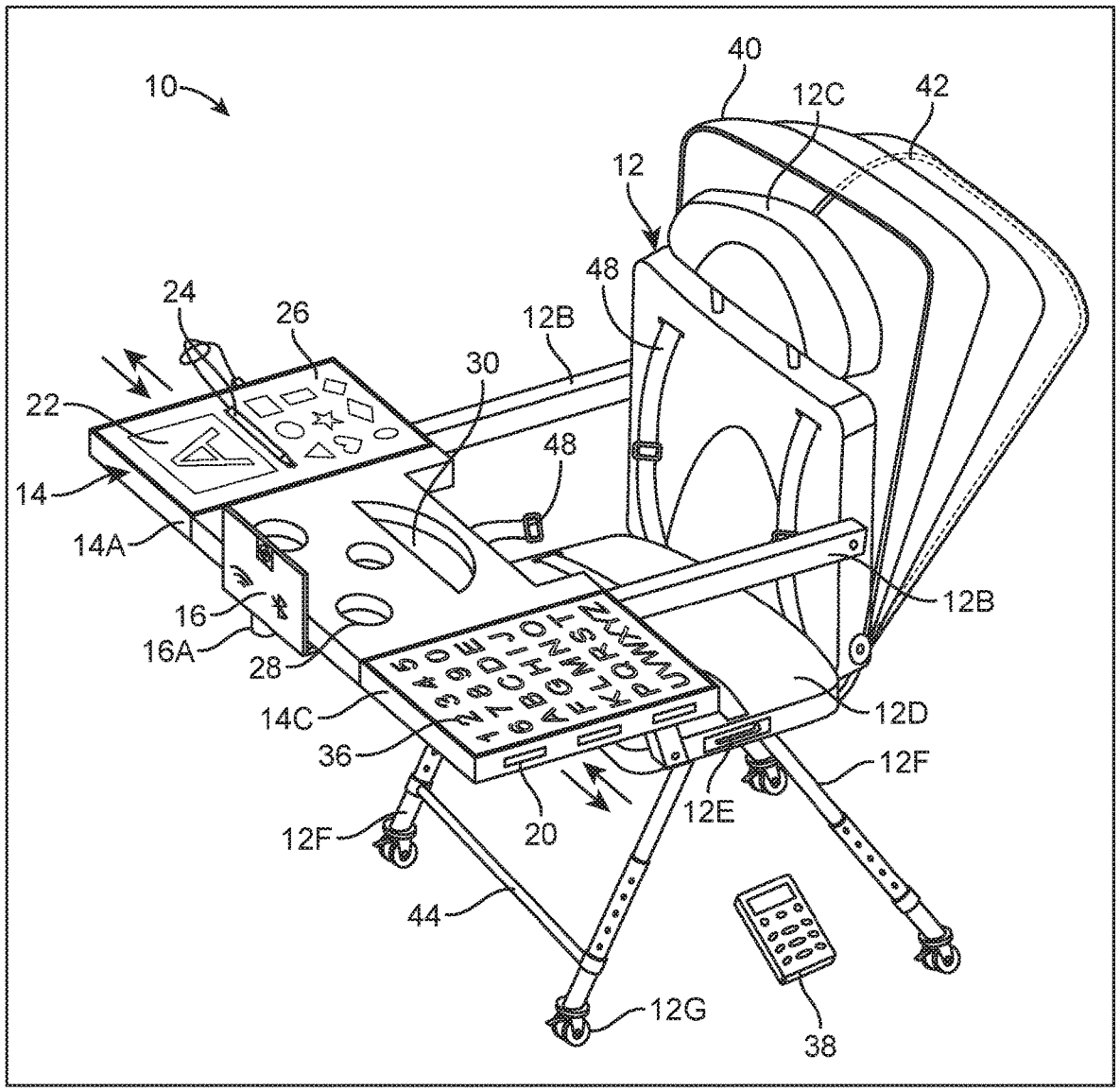
FIG. 2 illustrates another isometric view of arrangement 10, in accordance with an embodiment of the present invention, sans the child and with hood 40 being in its retracted configuration.
Figure 3:
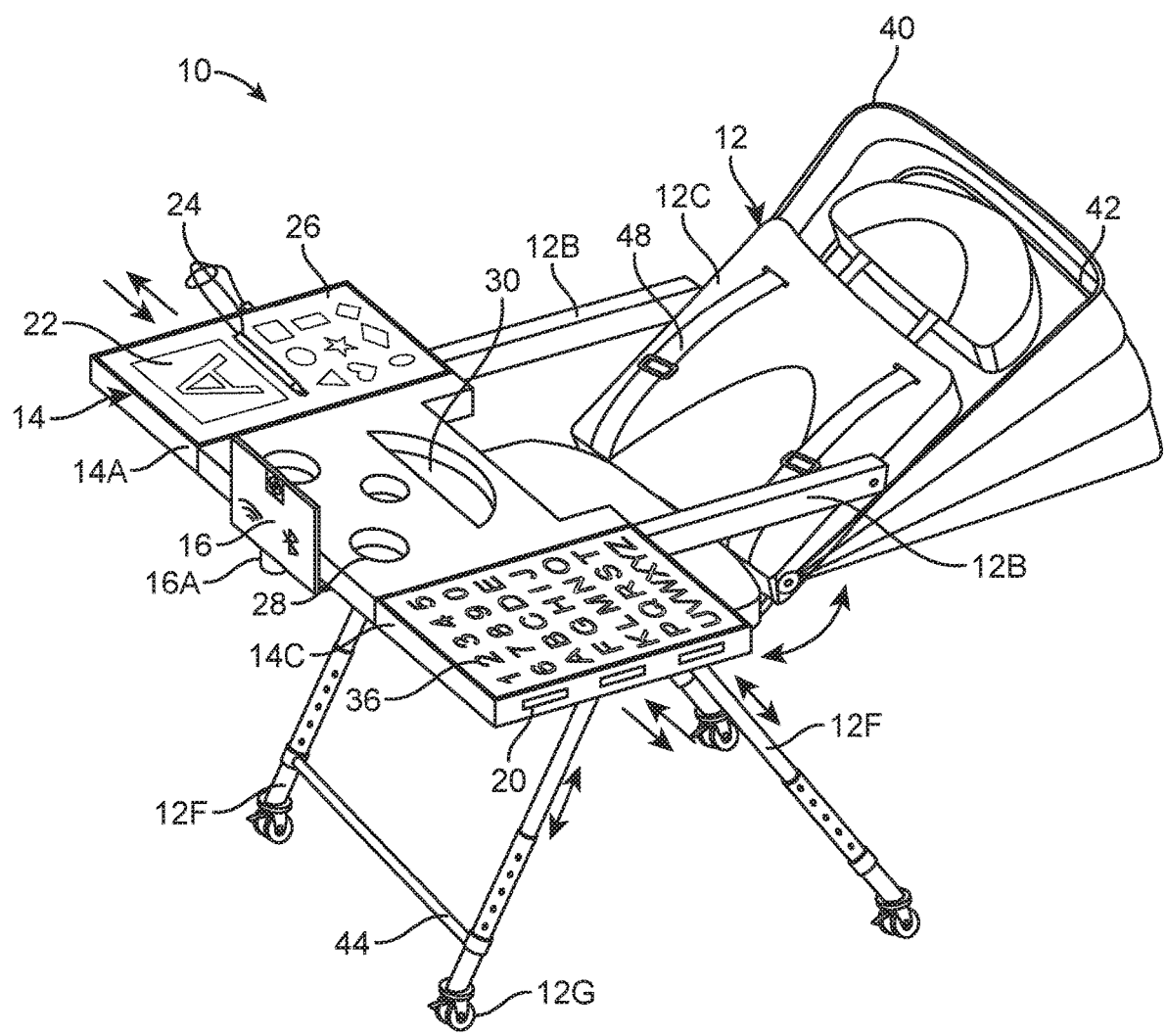
FIG. 3 illustrates another isometric view of arrangement 10, in accordance with an embodiment of the present invention, wherein backrest 12C of chair 12 is shown in its reclined configuration.
Figure 4:
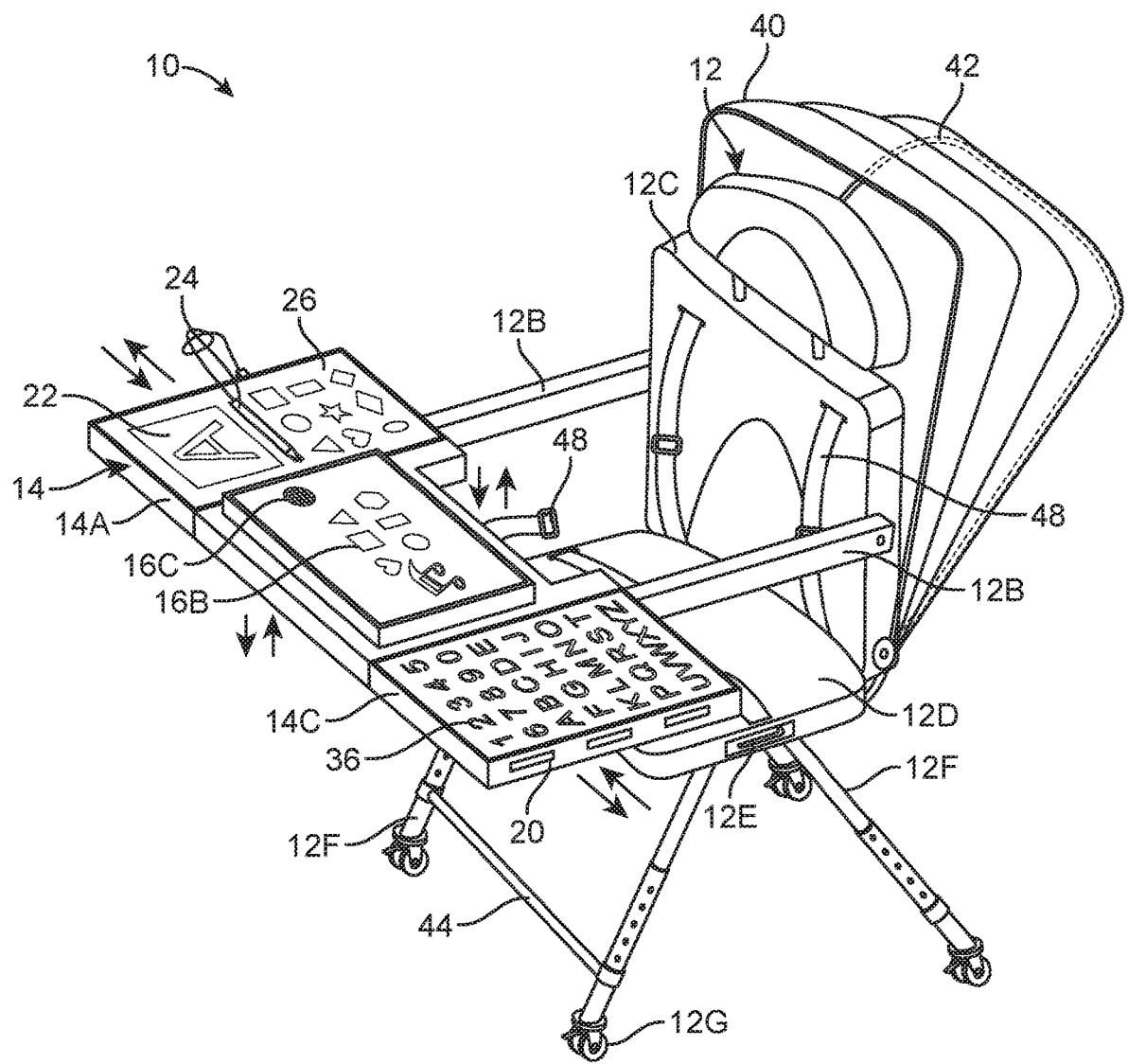
FIG. 4 illustrates an isometric view of arrangement 10, in accordance with another embodiment of the present invention.
Figure 5:
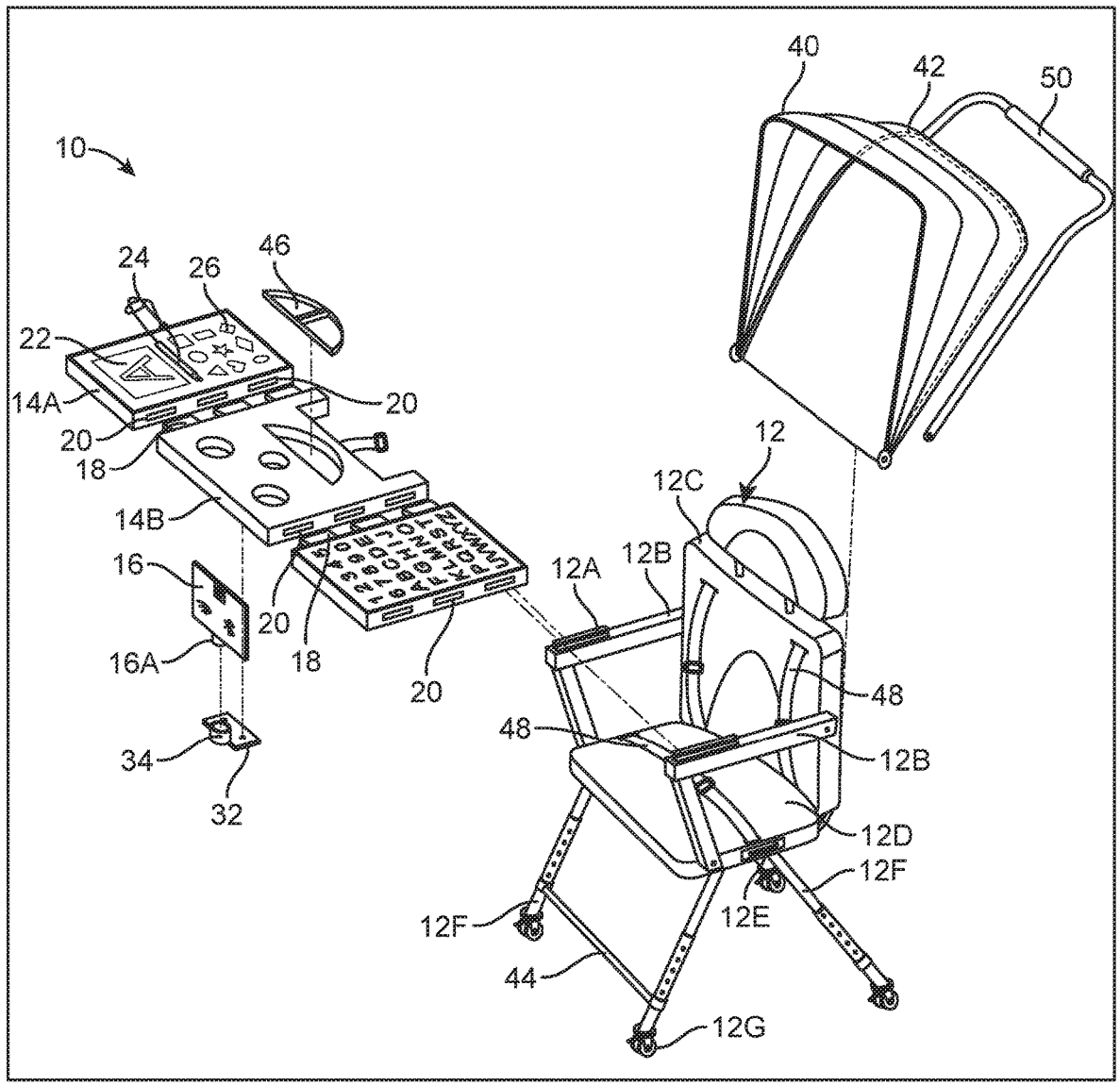
FIG. 5 illustrates an exploded view of arrangement 10, in accordance with an embodiment of the present invention.

Tray 14 comprises second section 14B. At least one cavity 28 is configured on second section 14B for supporting at least one cup therein. As seen in FIG. 1, second section 14B includes three cavities 28. However, the number of cavities 28 is not restricted to three and can be any number, per the size and design parameters. At least one cavity 30 is configured on second section 14B for accommodating an eating dish 46 therewithin. In one example, cavities 28, 30 are arranged on second section 14B to form a happy face, as seen in FIG. 2 and FIG. 3. Furthermore, interactive media 16 may be swivably mounted on second section 14B. In accordance with an embodiment of the present invention, interactive media 16 may be an interactive electronic display. The interactive electronic display, in accordance with one embodiment, may be a smart device such as a mobile device, a monitor, a screen or a tablet. The tablet may have different connectivity options, including but not limited to, Bluetooth, Wi-Fi, and the like. The swivable mounting of interactive media 16 on second section 14B is facilitated via a mounting bracket 32 having a cylindrical protrusion 34 in which interactive media 16 fitted via pivot 16A. Pivot 16A, in accordance with one embodiment, may facilitate swiveling of interactive media 16 along a longitudinal axis thereof within a pre-determined angular range. In one example, the pre-determined angular range may range from 0° to 180°. In another embodiment, as seen in FIG. 4, interactive media 16 may include an audio device instead of an electronic display. More specifically, different buttons 16B on the audio device may facilitate playing of different rhymes via speaker 16C. In an alternative embodiment, the interactive media 16 may include a tutorial video for arrangement 10 elaborately explaining the different functionalities and operational configurations of arrangement 10. In yet another alternative embodiment, interactive media 10 may include audio and video files for tutoring the user on pronunciation of different the letters with their phonic sounds, small words, and simple sentences.

Tray 14 comprises third section 14C. Third section 14C, in accordance with an embodiment of the present invention, includes a representation 36 of alphabet and numbers. In accordance with one embodiment, representation 36 may include LED lit characters.

Figure 6:
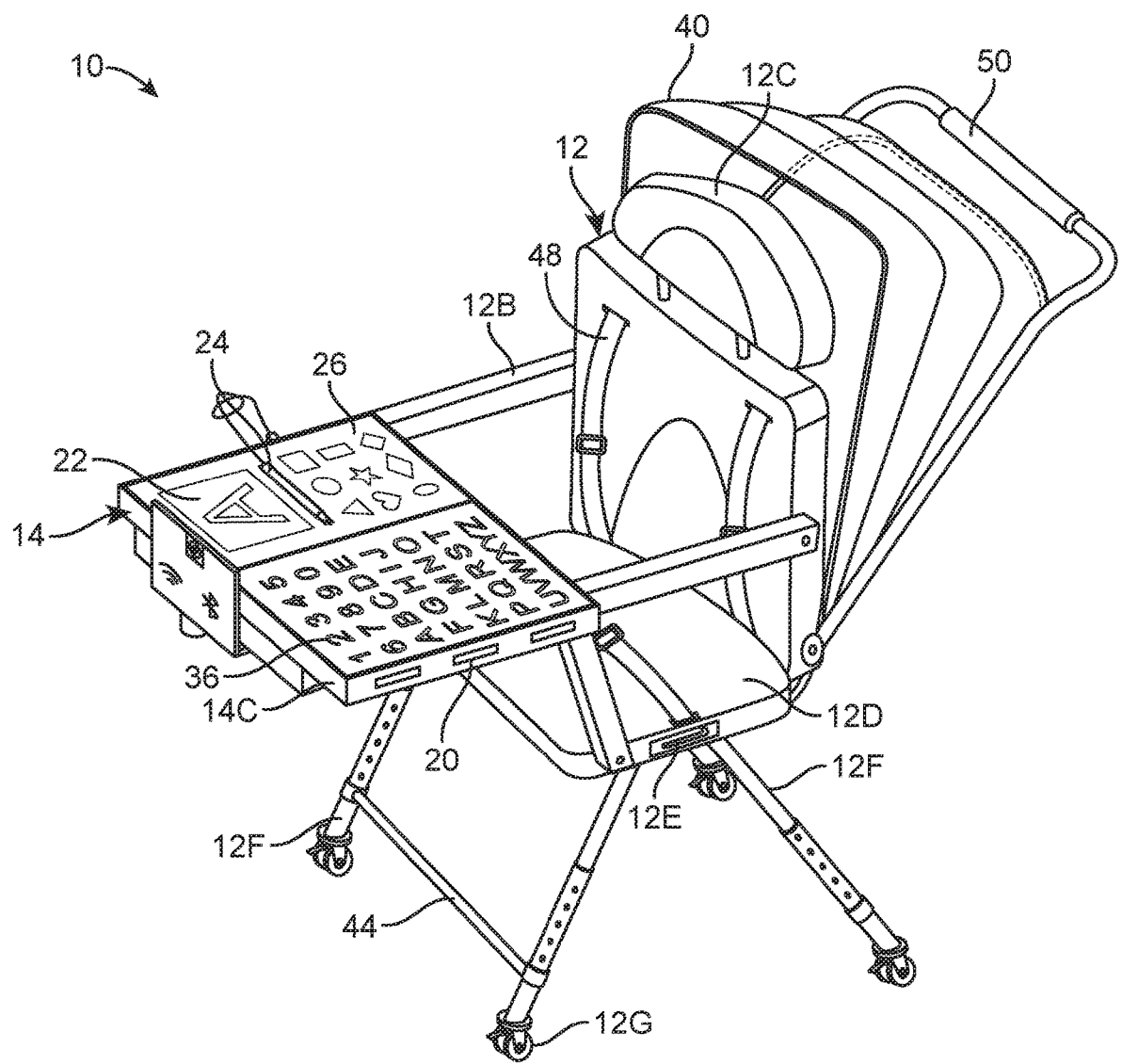
FIG. 6 illustrates an isometric view of arrangement 10, in accordance with another embodiment of the present invention.

In another embodiment, the positions of first section 14A and third section 14C of tray 14 may be interchanged depending on whether the user or the toddler seated on chair 12 is left-handed or right-handed. Furthermore, second section 14B of tray 14 may be removed when the toddler seated on chair 12 is not eating, while first section 14A and third section 14C are connected to each other, as seen in FIG. 6. Furthermore, as seen in FIG. 6, arrangement 10 may further include a push handle 50 coupled to chair 12 for maneuvering arrangement 10.

Arrangement 10 comprises chair 12. Chair 12 comprises a backrest 12C. Backrest 12C is reclinable for providing maximum comfort to the child supported or seated thereon. Chair 12 further comprises a seat 12D. Seat 12D includes a switch 12E for adjusting the recline of backrest 12C. In one embodiment, chair 12 may be configured with cushioning designed for providing maximum comfort to the child.

In accordance with an embodiment of the present invention, arrangement 10 comprises a remote controller 38. Remote controller 38, in accordance with one embodiment, may be used for controlling interactive media 16. In yet another embodiment, remote controller 38 may be used to adjust remotely the recline of backrest 12C.

Arrangement 10 further comprises a hood 40 coupled to backrest 12C of chair 12. As seen in FIG. 1, hood 40 may be used to provide cover the child seated on chair 12 for protecting the child from sun rays, in cases where arrangement 10 is deployed outdoors. According to another aspect, hood 40 may be used to protect child from any sort of light to make the child fall asleep while backrest 12C of chair 12 is in its reclined configuration.

Chair 12 further comprises a plurality of legs 12F, wherein legs 12F have a telescopic configuration that facilitates height adjustment of chair 12. In one embodiment, a foot rest 44 may be provided or assembled on pair of legs 12F. Foot rest 44 may be adjustable in height to allow for users to fit comfortably on chair 12 regardless of height. Chair 12 further comprises a plurality of wheels 12G affixed to plurality of legs 12F. Arrangement 10 further comprises a bar 42 that also allows a user to maneuver arrangement 10.

Chair 12 further comprises a plurality of straps 48 provided thereon for holding the child on the chair securely.

The present invention may facilitate the ability to learn. The present invention provides unlimited learning. Learning may also be done in various languages as well. The present invention may further include an instruction manual or booklet to facilitate the usage of the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A seating arrangement for interactive learning, said arrangement comprising:
   a. a chair for supporting a child thereon, wherein said chair includes a plurality of legs, wherein a proximal end of each of said plurality of legs is attached to a central bottom side of said chair, each of the said plurality of legs forming an angle with respect to a ground and configured to provide stability when sliding said chair, wherein a footrest is attached to at least two of the plurality of legs, wherein said footrest is configured to slide along said at least two of said plurality of legs, wherein said chair includes a backrest and a seat, said backrest is perpendicularly attached to a rear portion to said seat;
   b. a tray removably supported on said chair, wherein said tray includes a first section, a second section, and a third section that are coplanar and in abutting contact at lateral edges by protrusions and slots thereon, wherein the second section and third section include protrusions attached to one side and slots formed in another side; and
   c. at least one interactive media which has a rectangular body mounted on said tray as a detachable interactive media for facilitating interactive learning for the child supported on said chair, wherein said interactive media is waterproof and said chair is controlled by a remote controller to recline said backrest as required.

2. The system according to claim 1, wherein said first section includes at least one writing pad and at least one stylo, wherein said stylo is connected to a lateral side of said writing pad.

3. The system according to claim 2, wherein said first section includes a stencil containing a plurality of shapes below said writing pad as example for drawing figures with said stylo.

4. The system according to claim 1, wherein said first section, is configured to connect to either said third or said second section by said slots and protrusions.

5. The system according to claim 1, wherein said backrest includes armrests, said armrests have an elongated rectangular shape, said armrests are attached to a left side and a right side of said backrest.

6. The system according to claim 5, further comprising a hood coupled to said backrest of said chair wherein said hood is formed by hood sections that retract and extend one on top of each other.

7. The system according to claim 1, further including a plurality of wheels affixed to said plurality of legs wherein said plurality of wheels are attached to each opposite distal end of the plurality of legs.

8. A seating arrangement for interactive learning, said arrangement comprising:
   a. a chair for supporting a child thereon, wherein said chair further includes a plurality of straps a backrest, a seat and a plurality of legs wherein said plurality of legs are attached to a central bottom side of said chair forming a predetermined angle with respect to a ground to give stability when sliding said chair, wherein footrest is attached to a front portion of at least two said plurality of legs, wherein said footrest is configured to slide along said at least two of said plurality of legs, said backrest is perpendicularly attached to a rear portion of said seat, said legs are hollow cylindrical legs, said legs have a telescopic configuration;
   b. a push handle coupled to said chair;
   c. a tray removably supported on said chair, wherein said tray includes a first section, a second section, and a third section, wherein said first section includes at least one writing pad and at least one stylo, said stylo is electronically connected to said writing pad, said first section includes a stencil containing a plurality of shapes as a complement of examples for said first section, said first section, said second section, and said third section are coplanar in an abutting contact at lateral edges by protrusions and slots, said second section includes a plurality of cavities, said second section is capable of supporting a dish thereon said backrest on said chair is reclinable, said backrest includes armrests, each of said armrests is attached to a left side and a right side of said backrest respectively, wherein said backrest is controlled by a remote controller to recline said backrest, said chair includes a switch with a rectangular shape attached to a lateral side thereof for adjusting the recline of said backrest when not using said remote controller;
   d. at least one waterproof interactive media, wherein said at least one waterproof interactive media is a tablet, said tablet is perpendicularly configured on said tray as a detachable interactive media for facilitating interactive learning for said child supported on said chair;
   e. a hood coupled to said backrest of said chair;
   f. a bar coupled to said backrest of said chair to support the hood; and
   g. a plurality of retractable wheels affixed to said plurality of legs wherein each of the wheels is attached to a distal ending of each of the plurality of legs.

9. The system according to claim 1, wherein said second section includes a plurality of cavities arranged to set any eating dish.

* * * * *